US011855882B2

(12) United States Patent
Joukan

(10) Patent No.: US 11,855,882 B2
(45) Date of Patent: Dec. 26, 2023

(54) DISPLAY SYSTEM FOR VEHICLE AND IMAGE DISPLAYING METHOD OF DISPLAY SYSTEM FOR VEHICLE

(71) Applicant: Panasonic Intellectual Property Management Co., Ltd., Osaka (JP)

(72) Inventor: Seimizu Joukan, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 174 days.

(21) Appl. No.: 17/502,812

(22) Filed: Oct. 15, 2021

(65) Prior Publication Data

US 2022/0131788 A1 Apr. 28, 2022

(30) Foreign Application Priority Data

Oct. 23, 2020 (JP) ................................ 2020-177752

(51) Int. Cl.
*H04L 45/30* (2022.01)
*H04L 67/12* (2022.01)
*H04L 45/00* (2022.01)

(52) U.S. Cl.
CPC .............. *H04L 45/30* (2013.01); *H04L 45/22* (2013.01); *H04L 67/12* (2013.01)

(58) Field of Classification Search
CPC .......... H04L 45/30; H04L 67/12; H04L 45/24
See application file for complete search history.

(56) References Cited

U.S. PATENT DOCUMENTS

| | | | |
|---|---|---|---|
| 10,904,165 B2* | 1/2021 | Mujica | ................ H04L 41/0672 |
| 10,964,292 B2* | 3/2021 | Kim | ........................ G09G 5/14 |
| 11,032,191 B2* | 6/2021 | Nakagawa | .............. H04L 45/42 |
| 2018/0203226 A1 | 7/2018 | Tomioka | |

FOREIGN PATENT DOCUMENTS

| | | |
|---|---|---|
| JP | 2013-216182 | 10/2013 |
| JP | 2017-035980 | 2/2017 |
| JP | 2017-45104 | 3/2017 |
| JP | 2019-147535 | 9/2019 |
| WO | 2017/026454 | 2/2017 |

OTHER PUBLICATIONS

Notification of Reasons for Refusal (Office Action) in Japanese Patent Appl. No. 2020-177752, dated Oct. 4, 2022, along with an English translation thereof.

* cited by examiner

*Primary Examiner* — Chandrahas B Patel
(74) *Attorney, Agent, or Firm* — GREENBLUM & BERNSTEIN, P.L.C.

(57) ABSTRACT

A display system for a vehicle includes: an application server including a switched outputter that switches between destinations to one of which the vehicle signal is to be outputted, and outputs the vehicle signal, and image generators that generate an image signal based on the vehicle signal; display clients that display an image based on the image signal; and a signal path determiner that determines a first signal path for transmission of the vehicle signal and the image signal among signal paths connecting the switched outputter, the image generators, and the display clients. When an anomaly occurs in at least one element among the image generators and the display clients, the signal path determiner changes a signal path for transmission of the vehicle signal and the image signal from the first signal path to a second signal path.

12 Claims, 9 Drawing Sheets

DISPLAY SYSTEM FOR VEHICLE AND IMAGE DISPLAYING METHOD OF DISPLAY SYSTEM FOR VEHICLE

CROSS REFERENCE TO RELATED APPLICATION

The present application is based on and claims priority of Japanese Patent Application No. 2020-177752 filed on Oct. 23, 2020.

FIELD

The present disclosure relates to a display system for a vehicle and an image displaying method of the display system for a vehicle.

BACKGROUND

Conventionally, display systems for a vehicle that convert a vehicle signal including information about speed and a state of a battery into an image, and display the image have been known. Patent Literature (PTL) 1 discloses, as an example of such display systems for a vehicle, a display system for a vehicle that includes display devices and a control device for causing the display devices to display an image. When an anomaly occurs in one of devices, such as the display devices and the control device, the display system for a vehicle displays an image using a device in which an anomaly is not present.

CITATION LIST

Patent Literature

PTL 1: Japanese Unexamined Patent Application Publication No. 2017-35980

SUMMARY

However, the display system for a vehicle according to the above-mentioned PTL 1 can be improved upon.

In view of this, the present disclosure provides a display system for a vehicle capable of improving upon the above related art.

A display system for a vehicle according to an aspect of the present disclosure includes: an application server including (i) a switched outputter that receives a vehicle signal outputted from a vehicle, switches between destinations to one of which the vehicle signal received is to be outputted, and outputs the vehicle signal, and (ii) image generators that generate and output an image signal based on the vehicle signal outputted from the switched outputter; display clients that receive the image signal outputted from the application server, and display an image based on the image signal received; and a signal path determiner that determines a first signal path for transmission of the vehicle signal and the image signal among signal paths connecting the switched outputter, the image generators, and the display clients. When an anomaly occurs in at least one element among the image generators and the display clients, the signal path determiner changes a signal path for transmission of the vehicle signal and the image signal from the first signal path to a second signal path.

An image displaying method of a display system for a vehicle according to an aspect of the present disclosure is the image displaying method of the display system for a vehicle including a switched outputter that switches a vehicle signal's output destinations and outputs the vehicle signal, image generators that generate an image signal based on the vehicle signal, display clients that display an image based on the image signal, and a signal path determiner that determines a signal path connecting the switched outputter, one of the image generators, and one of the display clients. The image displaying method includes: changing, by the signal path determiner, the signal path for transmission of the vehicle signal and the image signal, when an anomaly occurs in at least one element among the image generators and the display clients.

A display system for a vehicle according to an aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS

Figure 1A:
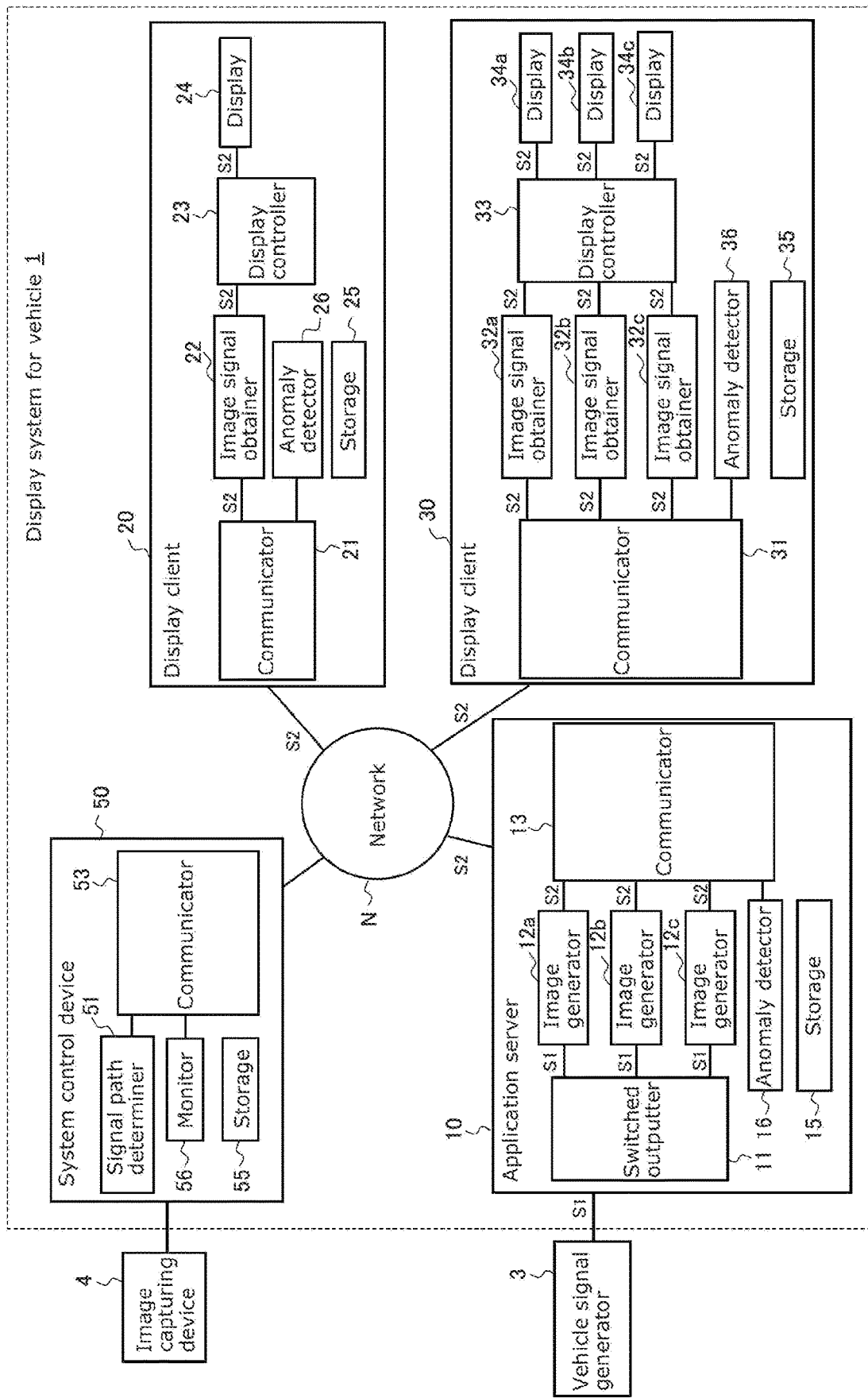
FIG. 1A is a block diagram illustrating an application server, display clients, and a system control device, which are included in a display system for a vehicle according to an embodiment.

The display system for a vehicle according to PTL 1 includes display devices each of which is provided with a function of converting a vehicle signal into an image in anticipation of an occurrence of an anomaly in a control device. This complicates signal paths for transmission of signals in the display system for a vehicle.

In order to address the above, a display system for a vehicle according to an aspect of the present disclosure includes: an application server including (i) a switched outputter that receives a vehicle signal outputted from a vehicle, switches between destinations to one of which the vehicle signal received is to be outputted, and outputs the vehicle signal, and (ii) image generators that generate and output an image signal based on the vehicle signal outputted from the switched outputter; display clients that receive the image signal outputted from the application server, and display an image based on the image signal received; and a signal path determiner that determines a first signal path for transmission of the vehicle signal and the image signal among signal paths connecting the switched outputter, the image generators, and the display clients. When an anomaly occurs in at least one element among the image generators and the display clients, the signal path determiner changes a signal path for transmission of the vehicle signal and the image signal from the first signal path to a second signal path.

As described above, the signal path determiner making a change of the signal path when an anomaly occurs in at least one of the image generators and display clients makes it possible to readily display an image using a signal path in which an anomaly is not present, for example.

In addition, the signal path determiner may output information about the second signal path to the application server, and the application server may establish a signal path between the switched outputter and one of the image generators, based on the information about the second signal path.

As described above, the application server establishing a signal path between the switched outputter and one of the image generators makes it possible to readily display an image using a signal path in which an anomaly is not present, when an anomaly occurs in at least one of the image generators.

In addition, at least one of the display clients may include image signal obtainers that obtain the image signal, and displays that display an image based on the image signal obtained by the image signal obtainers, and the signal path determiner may determine the first signal path among signal paths connecting the switched outputter, the image generators, the image signal obtainers, and the displays.

As described above, the signal path determiner determining the above-described signal path among the signal paths connecting the switched outputter, the image generators, the image signal obtainers, and the displays makes it possible to readily display an image using a signal path in which an anomaly is not present, when an anomaly occurs in the display system for a vehicle.

In addition, when an anomaly occurs in at least one element among the image generators, the image signal obtainers, and the displays, the signal path determiner may select, among the signal paths, the second signal path connecting the switched outputter, an image generator, an image signal obtainer, and a display in which an anomaly is not present.

As described above, the signal path determiner selecting a signal path connecting the switched outputter, an image generator in which an anomaly is not present, an image signal obtainer in which an anomaly is not present, and a display in which an anomaly is not present makes it possible to assuredly display an image using the selected signal path.

In addition, the signal path determiner may output information about the second signal path to the display clients, and at least one of the display clients may establish a signal path between one of the image signal obtainers and one of the displays, based on the information about the second signal path.

As described above, the display client establishing a signal path between one of the image signal obtainers and one of the displays makes it possible to readily display an image using a signal path in which an anomaly is not present, when an anomaly occurs in at least one of the image signal obtainers and the displays.

In addition, when the anomaly is gone after an occurrence of the anomaly, the signal path determiner may revert to the first signal path from the second signal path, and may output information about the first signal path to the application server and the display clients.

According to the display system for a vehicle, it is possible to readily revert to a former signal path to display an image, when an anomaly is gone.

In addition, the signal path determiner may change the signal path for transmission of the vehicle signal and the image signal from the first signal path to the second signal path, based on at least one of an importance level and an emergency level of vehicle information included in the vehicle signal.

According to the display system for a vehicle, it is possible to change a signal path based on an importance level and an emergency level to readily display an image.

In addition, the signal path determiner may change the signal path for transmission of the vehicle signal and the image signal from the first signal path to the second signal path, based on a subject of interest of at least one of a driver and a passenger of the vehicle.

According to the display system for a vehicle, it is possible to change a signal path such that a driver and a passenger are apt to notice the change, and to readily display an image.

In addition, the application server, the display clients, and the signal path determiner may be connected via a network in the vehicle.

According to the display system for a vehicle, it is possible to change a signal path using the network to readily display an image.

In addition, the signal path determiner may be provided in the application server, and the application server and the display clients may be connected via a network in the vehicle.

According to the display system for a vehicle, it is possible to change a signal path using the network to readily display an image.

In addition, the application server, the display clients, and the signal path determiner may be connected via a control network in the vehicle, and the application server and the display clients may be further connected via a data communication network in the vehicle.

According to the display system for a vehicle, it is possible to change a signal path using the control network and the data communication network to readily display an image.

An image displaying method of a display system for a vehicle according to an aspect of the present disclosure is an image displaying method of a display system for a vehicle that includes a switched outputter that switches a vehicle signal's output destinations and outputs the vehicle signal, image generators that generate an image signal based on the vehicle signal, display clients that display an image based on the image signal, and a signal path determiner that determines a signal path connecting the switched outputter, one of the image generators, and one of the display clients. The image displaying method includes: changing, by the signal path determiner, the signal path for transmission of the vehicle signal and the image signal, when an anomaly occurs in at least one element among the image generators and the display clients.

As described above, a change of a signal path in the display system for a vehicle when an anomaly occurs in at least one of the image generators and the display clients makes it possible to readily display an image using a signal path in which an anomaly is not present, for example.

Note that some of specific aspects described above may be implemented using a system, a method, an integrated circuit, a computer program, or a computer-readable recording medium such as a CD-ROM, or any optional combination of systems, methods, integrated circuits, computer programs, or computer-readable recording media.

The embodiments described below each show a specific example of the present disclosure. The numerical values, shapes, materials, elements, the arrangement of the elements, etc., in the following embodiments are mere examples, and therefore do not intend to limit the present disclosure. Moreover, among elements in the following embodiments, those not recited in any of the independent claims are described as optional elements. In addition, the embodiments may be combined.

Hereinafter, a display system for a vehicle according to an aspect of the present disclosure will be concretely described with reference to the drawings.

EMBODIMENT

[1. Configuration of Display System for Vehicle]

A configuration of display system for vehicle 1 according to an embodiment will be described with reference to FIG. 1A through FIG. 2.

Figure 1B:
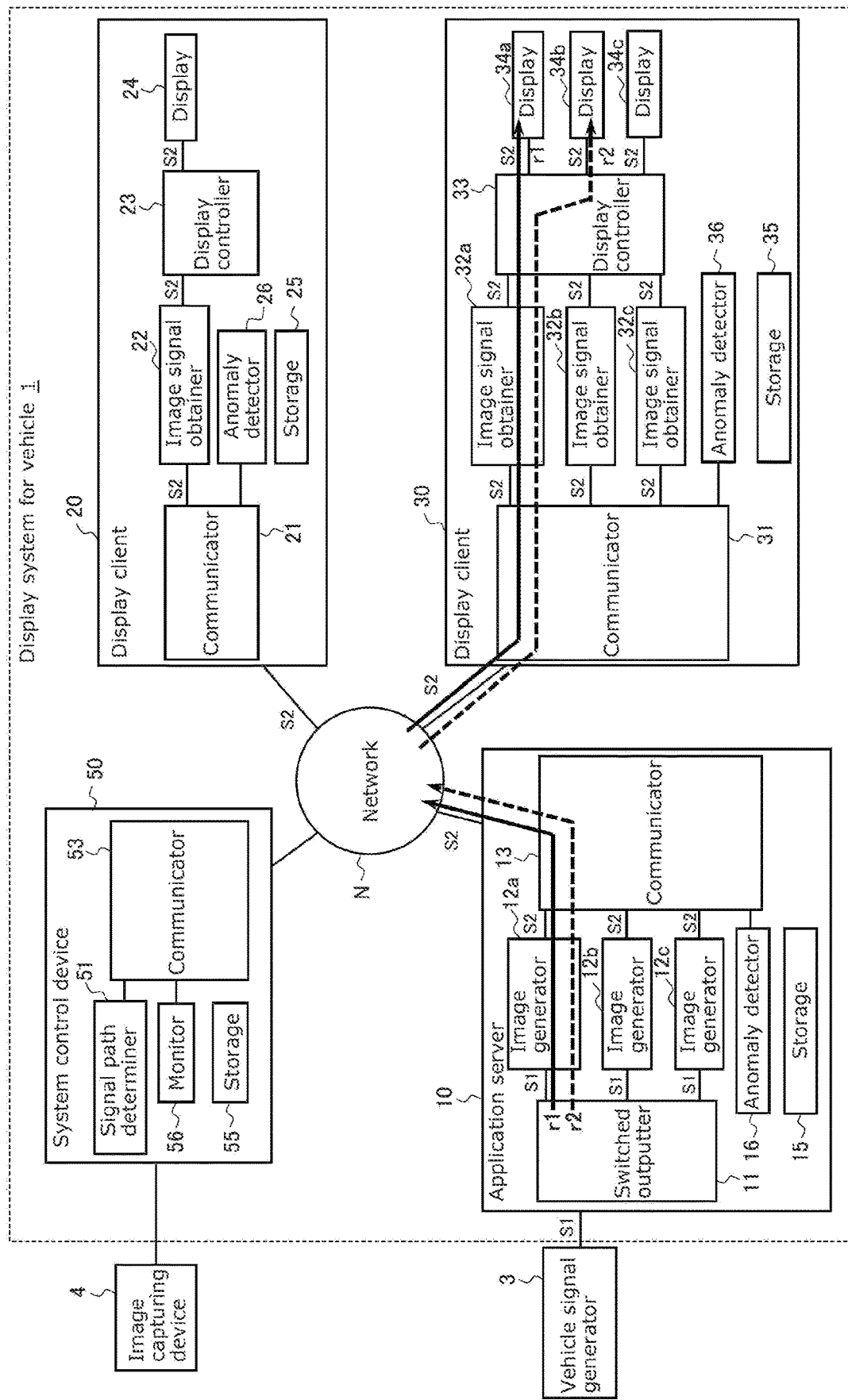
FIG. 1B is a diagram illustrating an example of signal paths in the display system for a vehicle according to the embodiment.
Figure 2:
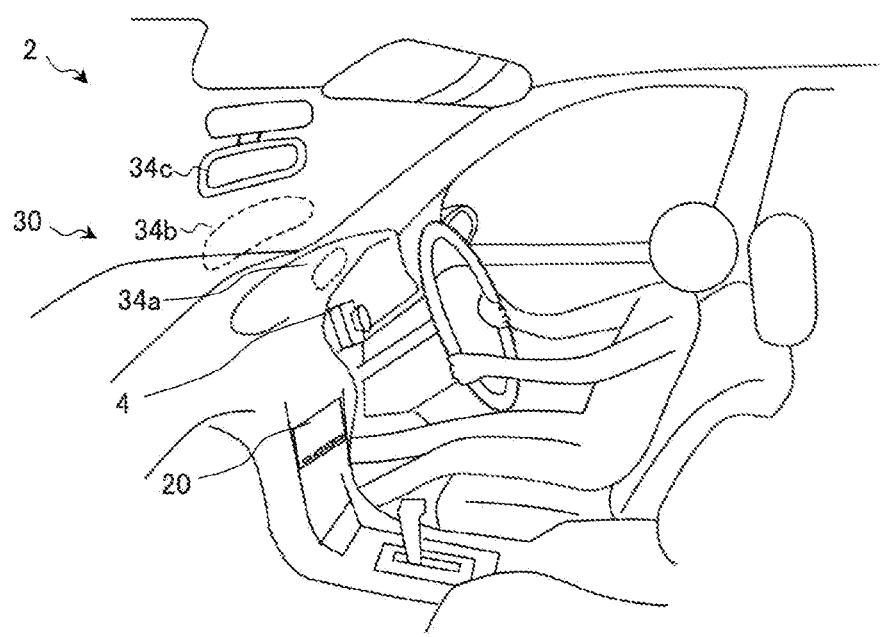
FIG. 2 is a diagram schematically illustrating the display clients, etc. provided in a vehicle.

FIG. 1A is a block diagram illustrating display system for vehicle 1. FIG. 1B is a diagram illustrating an example of signal paths in display system for vehicle 1. FIG. 2 is a diagram schematically illustrating display clients 20 and 30, etc. provided in vehicle 2. Note that FIG. 1A also illustrates vehicle signal generator 3 and image capturing device 4 which are provided in vehicle 2.

Vehicle signal generator 3 is a device that generates and outputs vehicle signal s1 including vehicle information. Vehicle signal generator 3 is a sensor device that detects vehicle information, such as speed, a state of a battery, and a state of safety operation of vehicle 2, and outputs the detected vehicle information as vehicle signal s1, for example. Vehicle signal generator 3 is also an in-vehicle device that outputs, as vehicle signal s1, vehicle information, such as a video content and navigation, for example.

Display system for vehicle 1 generates image signal s2 based on vehicle signal s1 outputted from vehicle signal generator 3, and displays an image based on image signal s2.

As illustrated in FIG. 1A, display system for vehicle 1 includes application server 10, display clients 20 and 30, and system control device 50. Application server 10, display clients 20 and 30, and system control device 50 are communicatively connected via network N in vehicle 2. Application server 10 is communicatively connected to vehicle signal generator 3.

Application server 10 generates image signals s2 based on various vehicle signals s1 outputted from vehicle signal generator 3, assigns image signals s2 to display clients 20 and 30, and outputs image signals s2 to assigned display clients 20 and 30. Application server 10 includes switched outputter 11, image generators 12a, 12b, and 12c, and communicator 13. In addition, application server 10 includes storage 15 and anomaly detector 16. Although FIG. 1A illustrates three image generators 12a through 12c, the image generators are not limited to three image generators. Display system for vehicle 1 may include two image generators, or may include four or more image generators.

Switched outputter 11 is a circuit that receives various vehicle signals s1 outputted from vehicle signal generator 3, switches between destinations to one of which the received vehicle signals s1 are outputted, and outputs the received vehicle signals s1. For example, among image generators 12a through 12c, switched outputter 11 outputs vehicle signal s1 to an image generator determined to be a destination to which various vehicle signals s1 are to be outputted. Note that a relation between vehicle signal s1 and each of image generators 12a through 12c capable of processing vehicle signal s1 is predetermined and set in system control device 50.

Image generators 12a through 12c are circuits each of which generates image signal s2 based on vehicle signal s1 outputted from switched outputter 11. In the present disclosure, image generators 12a through 12c are possible occurrence sources of an anomaly. Each of image generators 12a through 12c outputs various generated image signals s2 to communicator 13.

Communicator 13 is a circuit that communicates with display clients 20 and 30 and system control device 50, via network N. Image generators 12a through 12c and anomaly detector 16 are connected to communicator 13. Communicator 13 transmits each of image signals s2 generated by each of image generators 12a through 12c to display clients 20 and 30.

Storage 15 stores signal paths of display system for vehicle 1 for transmission of vehicle signals s1 and image signals s2. The signal paths of display system for vehicle 1 will be described later. Storage 15 is implemented by, for example, a volatile storage device, such as static random-access memory (SRAM) or dynamic RAM (DRAM), or a non-volatile storage device, such as a magnetic disk, an optical disk, a magneto-optical disk, read-only memory (ROM), or flash memory.

Anomaly detector 16 is a circuit that detects the presence or absence of an anomaly in application server 10. For example, anomaly detector 16 detects an occurrence of an anomaly in image generators 12a through 12c. Information about the presence or absence of an anomaly in application server 10 is outputted to system control device 50 via communicator 13, etc. System control device 50 determines a signal path for transmission of vehicle signals s1 and image signals s2 according to the presence or absence of an anomaly in application server 10.

Application server 10 transmits various image signals s2 generated by image generators 12a through 12c to display clients 20 and 30 using the signal path determined by system control device 50.

Display clients 20 and 30 receive various image signals s2 outputted from application server 10, and display images based on the received image signals s2. Each of display clients 20 and 30 is, for example, an instrument panel, a rear-view monitor, a head-up display, or an in-vehicle monitor which are provided in front of a driver's seat of vehicle 2. Although FIG. 1A illustrates two display clients 20 and 30, display system for vehicle 1 may include three or more display clients. Display clients 20 and 30 according to the present disclosure do not have a function that the image generators perform, such as a function of converting vehicle signal s1 into image signal s2.

Display client 20, which is one of display clients 20 and 30, includes communicator 21, image signal obtainer 22, display controller 23, and display 24. In addition, display client 20 includes storage 25 and anomaly detector 26.

Communicator 21 is a communication circuit that communicates with application server 10 and system control device 50, via network N. Image signal obtainer 22 and anomaly detector 26 are connected to communicator 21.

Image signal obtainer 22 is a circuit that obtains image signal s2 received by communicator 21. In the present disclosure, image signal obtainer 22 is a possible occurrence source of an anomaly. Image signal s2 obtained by image signal obtainer 22 is outputted to display controller 23. Note that image signal s2 is not directly outputted to display 24 from image signal obtainer 22, and is temporarily inputted to display controller 23.

Display controller 23 controls operation of display client 20 based on a control command outputted from system control device 50. For example, display controller 23 outputs image signal s2 to display 24 which is determined to be a destination to which display controller 23 outputs image signal s2.

Display 24 is, for example, a display device such as a liquid-crystal panel, etc., and displays an image based on image signal s2 outputted from display controller 23. In the present disclosure, display 24 is a possible occurrence source of an anomaly.

Storage 25 stores signal paths of display system for vehicle 1. Like storage 15, storage 25 is implemented by a volatile storage device, a non-volatile storage device, etc.

Anomaly detector 26 is a circuit that detects the presence or absence of an anomaly in display client 20. For example, anomaly detector 26 detects an occurrence of an anomaly in image signal obtainer 22 and display 24. Information about the presence or absence of an anomaly in display client 20 is outputted to system control device 50 via communicator 21, etc. System control device 50 changes a signal path for transmission of image signal s2 according to the presence or absence of an anomaly in display client 20.

Display client 30, which is the other of display clients 20 and 30, includes communicator 31, image signal obtainers 32a, 32b, and 32c, display controller 33, and displays 34a, 34b, and 34c. In addition, display client 30 includes storage 35 and anomaly detector 36. Although FIG. 1A illustrates three image signal obtainers 32a through 32c and three displays 34a through 34c, display system for vehicle 1 may include two, or four or more image signal obtainers and displays.

Communicator 31 is a communication circuit that communicates with application server 10 and system control device 50, via network N. Image signal obtainers 32a through 32c and anomaly detector 36 are connected to communicator 31.

Image signal obtainers 32a through 32c each are a circuit that obtains image signal s2 received by communicator 31. In the present disclosure, image signal obtainers 32a through 32c are possible occurrence sources of an anomaly. Image signals s2 obtained by image signal obtainers 32a through 32c are outputted to display controller 23. Note that image signals s2 are not directly outputted to displays 34a through 34c from image signal obtainers 32a through 32c, and are temporarily inputted to display controller 33.

Display controller 33 controls operation of display client 30 based on a control command outputted from system control device 50. For example, display controller 33 outputs image signal s2 to, among displays 34a through 34c, a display determined to be a destination to which various image signals s2 are to be outputted. Note that a relation between image signal s2 and each of displays 34a through 34c capable of displaying image signal s2 is predetermined and set in system control device 50.

Displays 34a through 34c each are, for example, a display device such as a liquid-crystal panel, etc., and display an image based on each of image signals s2 outputted from display controller 33. In the present disclosure, displays 34a through 34c are possible occurrence sources of an anomaly.

Storage 35 stores signal paths of display system for vehicle 1. Like storage 15, storage 35 is implemented by a volatile storage device, a non-volatile storage device, etc.

Anomaly detector 36 is a circuit that detects the presence or absence of an anomaly in display client 30. For example, anomaly detector 36 detects an occurrence of an anomaly in image signal obtainers 32a through 32c and displays 34a through 34c. Information about the presence or absence of an anomaly in display client 30 is outputted to system control device 50. System control device 50 changes a signal path for transmission of image signal s2 according to the presence or absence of an anomaly in display client 30.

As has been described above, display clients 20 and 30 each transmit image signal s2 using a signal path determined by system control device 50, and display an image based on image signal s2.

System control device 50 controls operation of application server 10 and display clients 20 and 30. System control device 50 includes signal path determiner 51, communicator 53, storage 55, and monitor 56.

Communicator 53 is a communication circuit that communicates with application server 10 and display clients 20 and 30, via network N. In addition, communicator 53 is a circuit for performing internal communication of system control device 50. Signal path determiner 51 and monitor 56 are connected to communicator 53.

Storage 55 stores signal paths for transmission of vehicle signals s1 and image signals s2. Furthermore, storage 55 stores a history of changes made to signal paths including an initial signal path and a signal path that has been changed from the initial signal path. Moreover, storage 15 stores a control program, etc. for implementing an image displaying method of display system for vehicle 1. Like storage 15, storage 55 is implemented by a volatile storage device, a non-volatile storage device, etc.

Monitor 56 is a device that monitors a system state of display system for vehicle 1. Monitor 56 obtains information about the presence or absence of an anomaly outputted from anomaly detectors 16, 26, and 36, for example. The obtained information about the presence or absence of an anomaly is outputted to signal path determiner 51.

Signal path determiner 51 is a circuit that determines, among signal paths connecting switched outputter 11, image generators 12a through 12c, and display clients 20 and 30, a signal path for transmission of vehicle signals s1 and image signals s2. Note that signal path determiner 51 may be identified as a circuit that determines a signal path for transmission of vehicle signals s1 and image signals s2 among signal paths connecting switched outputter 11, image generators 12a through 12c, image signal obtainers 22 and 32a through 32c, and displays 24 and 34a through 34c, including internal paths of display clients 20 and 30.

Here, an example of a change of a signal path of display system for vehicle 1 will be described.

Signal path determiner 51 changes a signal path for transmission of vehicle signals s1 and image signals s2 from a first signal path to a second signal path, when an anomaly occurs in at least one of image generators 12a through 12c and display clients 20 and 30. Note that the first signal path and the second signal path are examples of signal paths among the signal paths.

For example, when an anomaly occurs in image generator 12a in the case where a first signal path used under normal conditions in which an anomaly is not present connects "switched outputter 11, image generator 12a, and display client 20", signal path determiner 51 selects image generator 12b different from image generator 12a in which an anomaly is present, and determines a second signal path connecting "switched outputter 11, image generator 12b, and display client 20" to be an alternative signal path.

For example, when an anomaly occurs in display client 20 in the case where a first signal path used under normal conditions is the same as the above-described first signal path, signal path determiner 51 selects display client 30 different form display client 20 in which an anomaly is present, and determines a second signal path connecting "switched outputter 11, image generator 12a, and display client 30" to be an alternative signal path.

For example, when an anomaly occurs in display 34a in the case where first signal path r1 (see FIG. 1B) used under normal conditions connects "switched outputter 11, image generator 12a, image signal obtainer 32a, and display 34a", signal path determiner 51 selects display 34b different from display 34a in which an anomaly is present, and determines second signal path r2 (see FIG. 1B) connecting "switched outputter 11, image generator 12a, image signal obtainer 32a, and display 34b" to be an alternative signal path. In this case, signal path determiner 51 may change both an image signal obtainer and a display, and determines a second signal path connecting "switched outputter 11, image generator 12a, image signal obtainer 32b, and display 34b" to be an alternative signal path.

For example, when an anomaly occurs in image signal obtainer 32a in the case where a first signal path used under normal conditions is the same as the above-described first signal path, signal path determiner 51 selects image signal obtainer 32b different from image signal obtainer 32a in which an anomaly is present, and determines a second signal path connecting "switched outputter 11, image generator 12a, image signal obtainer 32b, and display 34a" to be an alternative signal path. In this case, signal path determiner 51 may change both an image signal obtainer and a display, and determines a second signal path connecting "switched outputter 11, image generator 12a, image signal obtainer 32b, and display 34b" to be an alternative signal path.

For example, when an anomaly simultaneously occurs in image generator 12a and image signal obtainer 32a in the case where a first signal path used under normal conditions is the same as the above-described first signal path, signal path determiner 51 selects image generator 12b and image signal obtainer 32b different from image generator 12a and image signal obtainer 32a in each of which an anomaly is present, and determines a second signal path connecting "switched outputter 11, image generator 12b, image signal obtainer 32b, and display 34a" to be an alternative signal path. In this case, signal path determiner 51 may also change a display, and determines a second signal path connecting "switched outputter 11, image generator 12b, image signal obtainer 32b, and display 34b" to be an alternative signal path. The foregoing apply to the case where an anomaly occurs in image generator 12a and display 34a, and to the case where an anomaly occurs in image signal obtainer 32a and display 34a.

For example, when an anomaly simultaneously occurs in image generator 12a, image signal obtainer 32a, and display 34a in the case where a first signal path used under normal conditions is the same as the above-described first signal path, signal path determiner 51 selects image generator 12b, image signal obtainer 32b, and display 34b different from image generator 12a, image signal obtainer 32a, and display 34a in each of which an anomaly is present, and determines a second signal path connecting "switched outputter 11, image generator 12b, image signal obtainer 32b, and display 34b" to be an alternative signal path.

As has been described above, when an anomaly occurs in at least one of image generators 12a through 12c, image signal obtainer 22 and 32a through 32c, and displays 24 and 34a through 34c, signal path determiner 51 selects, among the signal paths, a signal path connecting an image generator, an image signal obtainer, and a display in each of which an anomaly is not present.

When a change of a signal path is determined as described above, signal path determiner 51 outputs information about a second signal path that has been changed from the first signal path to application server 10 and display clients 20 and 30.

Application server 10 establishes an internal signal path based on information about the second signal path outputted from signal path determiner 51. Specifically, application server 10 establishes a signal path between switched outputter 11 and one of image generators 12a through 12c, based on the information about the second signal path. Display client 30 establishes an internal signal path based on the information about the second signal path outputted from signal path determiner 51. Specifically, display controller 33 of display client 30 establishes a signal path between one of image signal obtainers 32a through 32c and one of displays 34a through 34c, based on the information about the second signal path. Note that, even between application server 10 and display clients 20 and 30, a signal path between application server 10 and each of display clients 20 and 30 is established based on the information about the second signal path determined by signal path determiner 51.

Although signal path determiner 51 changes a signal path when an anomaly occurs in elements included in application server 10 or display clients 20 and 30, a second signal path that is to be changed from a first signal path may be a signal path predetermined by a user, or may be a signal path to be changed according to circumstances.

For example, signal path determiner 51 may change a signal path for transmission of vehicle signals s1 and image signals s2 from a first signal path to a second signal path based on an importance level of vehicle information included in vehicle signal s1. Vehicle information having a high importance level is, for example, mandatory information to be displayed or information necessary for appropriately maintaining the operation of a vehicle. When a particular display is displaying an image of vehicle information having a low importance level, signal path determiner 51 may stop displaying the image, and may change a signal path such that an image of vehicle information having a high importance level is displayed instead.

For example, signal path determiner 51 may change a signal path for transmission of vehicle signals s1 and image signals s2 from a first signal path to a second signal path, based on an emergency level of vehicle information included in vehicle signal s1. Vehicle information having a high emergency level is, for example, information about safety of a driver, a passenger, and a pedestrian. When vehicle information having a high importance level is inputted to display system for vehicle 1 from an engine control unit (ECU), signal path determiner 51 may change a signal path such that all displays 24 and 34a through 34c simultaneously display the vehicle information.

For example, signal path determiner 51 may change a signal path for transmission of vehicle signals s1 and image signals s2 from a first signal path to a second signal path, based on a subject of interest of at least one of a driver and a passenger of vehicle 2. Specifically, signal path determiner 51 may obtain a direction toward which the driver or the passenger faces and a direction at which the driver or the passenger is looking using image capturing device 4, such as a near-infrared camera, provided in vehicle 2, and may change a signal path such that a display within the sight of the driver or the passenger displays an image. In addition, signal path determiner 51 may change a signal path so that the display that is most readily seen by the driver or the passenger displays an image, according to vehicle information to be displayed. Moreover, signal path determiner 51 may change a signal path so that the display that is most frequently seen by the driver or the passenger displays an image, among the displays that have been seen by the driver or the passenger.

As has been described above, signal path determiner 51 changes a signal path for transmission of vehicle signals s1 and image signals s2, when an anomaly occurs in at least one of image generators 12a through 12c included in application server 10 and display clients 20 and 30. With this, it is possible to readily display an image using a signal path in which an anomaly is not present.

[2. Image Displaying Method of Display System for Vehicle]

An image displaying method of the display system for a vehicle according to the embodiment which is employed when display system for vehicle 1 is under normal conditions, and when an anomaly occurs in display system for vehicle 1 will be individually described.

Figure 3:
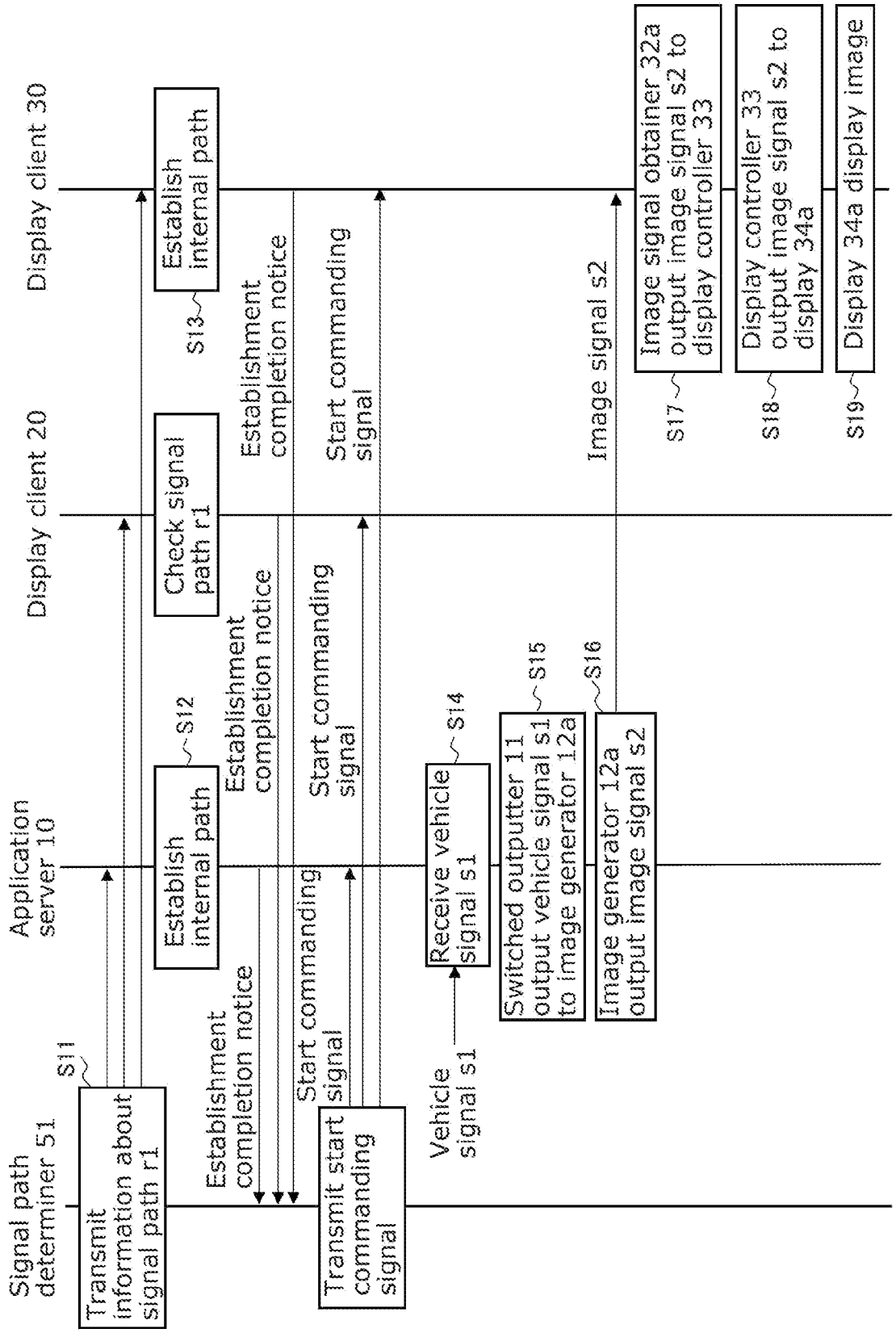
FIG. 3 is a ladder diagram illustrating operation performed by the display system for a vehicle according to the embodiment under normal conditions.

FIG. 3 is a ladder diagram illustrating operation performed by display system for vehicle 1 under normal conditions.

First, signal path determiner 51 outputs predetermined signal paths to application server 10 and display clients 20 and 30. The predetermined signal paths are stored in storage 55 by user input, and are determined to indicate the following items (1) through (4). (1) A signal path for displaying vehicle information about speed of a vehicle, which is a signal path connecting "switched outputter 11, image generator 12a, image signal obtainer 32a, and display 34a". (2) A signal path for displaying vehicle information about a state of a battery, which is a signal path connecting "switched outputter 11, image generator 12b, image signal obtainer 32b, and display 34b". (3) A signal path for displaying vehicle information about a state of safety operation, which is a signal path connecting "switched outputter 11, image generator 12c, image signal obtainer 32c, and display 34c". (4) A signal path for displaying vehicle information about a video content and navigation, which is a signal path connecting "switched outputter 11, image generator 12c, image signal obtainer 22, and display 24".

The following provides an example in which vehicle signal s1 including information about speed of a vehicle is inputted, and first signal path r1 (i.e., a path connecting switched outputter 11, image generator 12a, image signal obtainer 32a, and display 34a) for processing the signal is established. Hereinafter, it should be noted that first signal path r1 may be referred to as "signal path r1".

First, signal path determiner 51 transmits information about signal path r1 to application server 10, and display clients 20 and 30 (step S11).

Application server 10 receives the information about signal path r1, and establishes an internal path connecting switched outputter 11 and image generator 12a as a path in application server 10 (step S12). The information about the established signal path r1 is stored in storage 15. Application server 10 then replies to signal path determiner 51 with an establishment completion notice.

Display clients 20 and 30 also receive the information about signal path r1. Display client 30 establishes an internal path connecting image signal obtainer 32a and display 34a as a path in display client 30 (step S13). The information about the established signal path r1 is stored in storage 35. Display client 30 then replies to signal path determiner 51 with an establishment completion notice. Although signal path r1 is not established in display client 20, display client 20 stores the information about signal path r1 in storage 25 after checking signal path r1. After the information about signal path r1 is stored, display client 20 replies to signal path determiner 51 with an establishment completion notice.

When signal path determiner 51 receives the replied establishment completion notices, signal path determiner 51 transmits a start commanding signal commanding the start of image display processing to each of application server 10 and display clients 20 and 30. Note that system control device 50 may check the presence of an anomaly in elements included in application server 10 and display clients 20 and 30 during a time at which signal path r1 is established. In addition, the establishment of signal path r1 performed in steps S11 through S13 need not be performed. Signal path r1 may be initially established as a default setting.

The following describes a situation in which an image is displayed after vehicle signal s1 is actually inputted.

First, switched outputter 11 receives vehicle signal s1 outputted from vehicle signal generator 3 (step S14). Switched outputter 11 outputs vehicle signal s1 to image generator 12a according to the established signal path r1 (step S15). Image generator 12a receives vehicle signal s1, converts vehicle signal s1 into image signal s2, and outputs image signal s2 (step S16).

Image signal s2 outputted from image generator 12a is inputted to image signal obtainer 32a via communicator 13, network N, and communicator 31. Image signal obtainer 32a outputs the inputted image signal s2 to display controller 33 (step S17). Display controller 33 outputs image signal s2 to display 34a according to the established signal path r1 (step S18). Display 34a displays an image based on the inputted image signal s2 (step S19). This ends the processing performed by display system for vehicle 1 under normal conditions. The same processing is performed for other signal paths.

Figure 4:
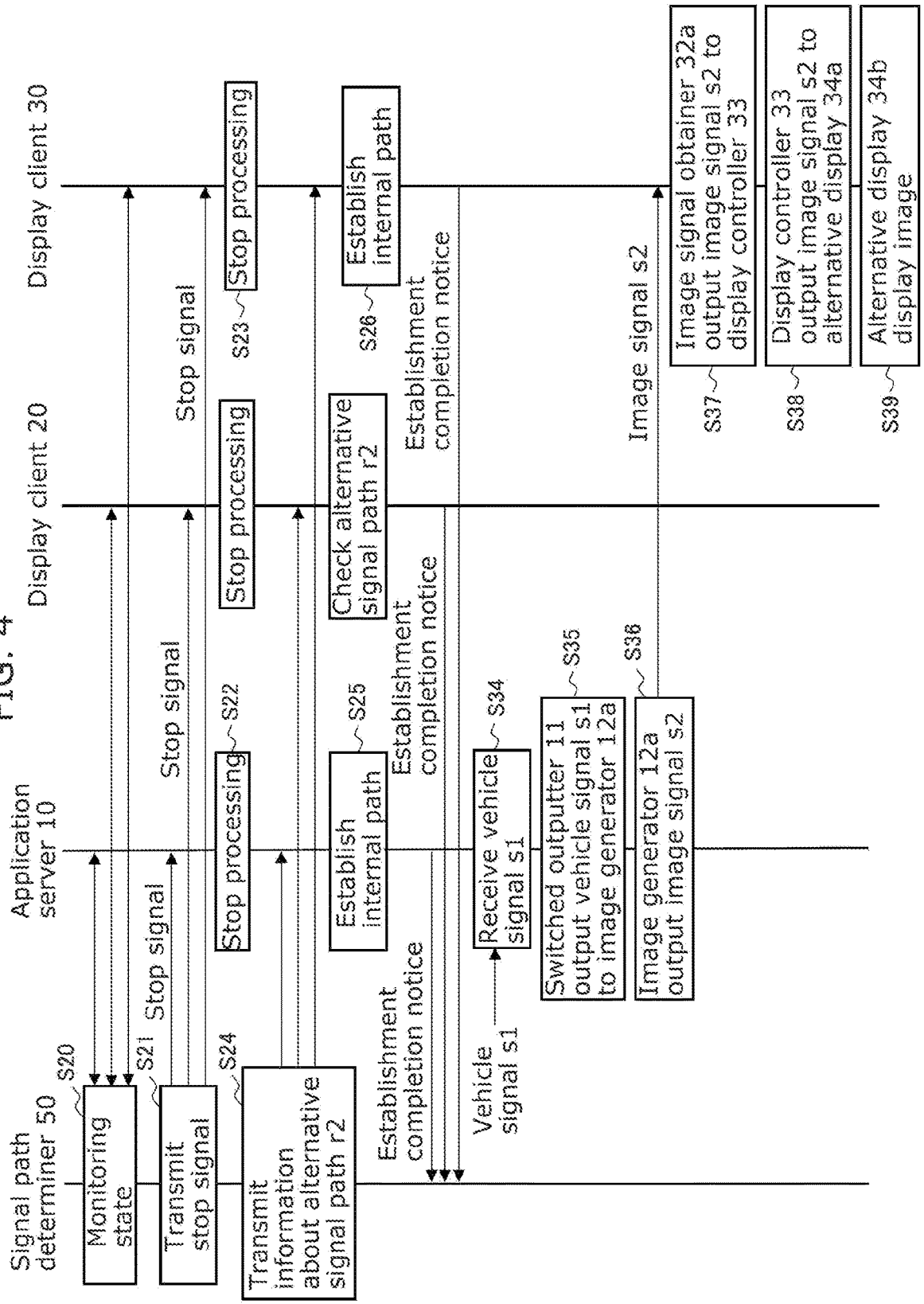
FIG. 4 is a ladder diagram illustrating operation performed by the display system for a vehicle according to the embodiment when an anomaly occurs in the display system for a vehicle.

FIG. 4 is a ladder diagram illustrating operation performed by display system for vehicle 1 when an anomaly occurs in display system for vehicle 1. The following describes an example in which display 34b is used instead of display 34a to display an image due to a failure in display 34a.

First, system control device 50 is in a monitoring state of monitoring the presence of an anomaly in application server 10 and display clients 20 and 30 (step S20). For example, when anomaly detector 36 detects an anomaly in display 34a in the monitoring state, the detected information is transmitted to system control device 50.

When system control device 50 recognizes the anomaly in display 34a, system control device 50 stops processing to be performed in signal path r1 which includes display 34a. Specifically, system control device 50 transmits a stop signal for stopping the processing to be performed in signal path r1 to each of application server 10 and display clients 20 and 30 (step S21).

When application server 10 receives the stop signal, application server 10 stops output processing of outputting image signal s2 for causing display 34a to display an image (step S22). In addition, when display clients 20 and 30 receive the stop signal, display clients 20 and 30 stop image displaying processing relating to display 34a (step S23).

Signal path determiner 51 determines a change of a signal path from first signal path r1 which is a signal path used under normal conditions to second signal path r2 which is an alternative signal path, and transmits information about the alternative signal path r2 to application server 10 and display clients 20 and 30 (step S24). As described above, the alternative signal path r2 may be a signal path predetermined by a user, or may be a signal path changed according to circumstances. Hereinafter, it should be noted that second signal path r2 may be referred to as "signal path r2" or "alternative signal path r2".

Application server 10 receives the information about alternative signal path r2, and establishes an internal path of application server 10 (step S25). The information about alternative signal path r2 is stored in storage 15. Application server 10 then replies to signal path determiner 51 with an establishment completion notice.

Display clients 20 and 30 also receive the information about alternative signal path r2. Display client 30 determines an internal path connecting image signal obtainer 32*a* and display 34*b* as a path in display client 30 (step S26). The information about alternative signal path r2 is stored in storage 35. Display client 30 then replies to signal path determiner 51 with an establishment completion notice. Although signal path r2 is not established in display client 20, display client 20 stores the information about signal path r2 in storage 25 after checking signal path r2. After the information about signal path r2 is stored, display client 20 replies to signal path determiner 51 with an establishment completion notice.

Figure 5:
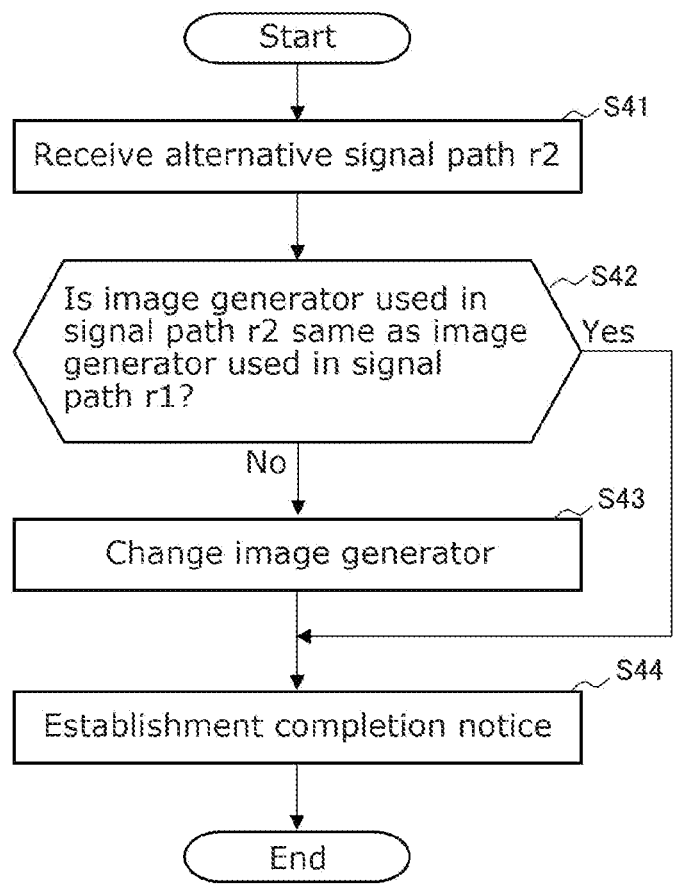
FIG. 5 is a flowchart illustrating operation performed by the application server when an anomaly occurs.
Figure 6:
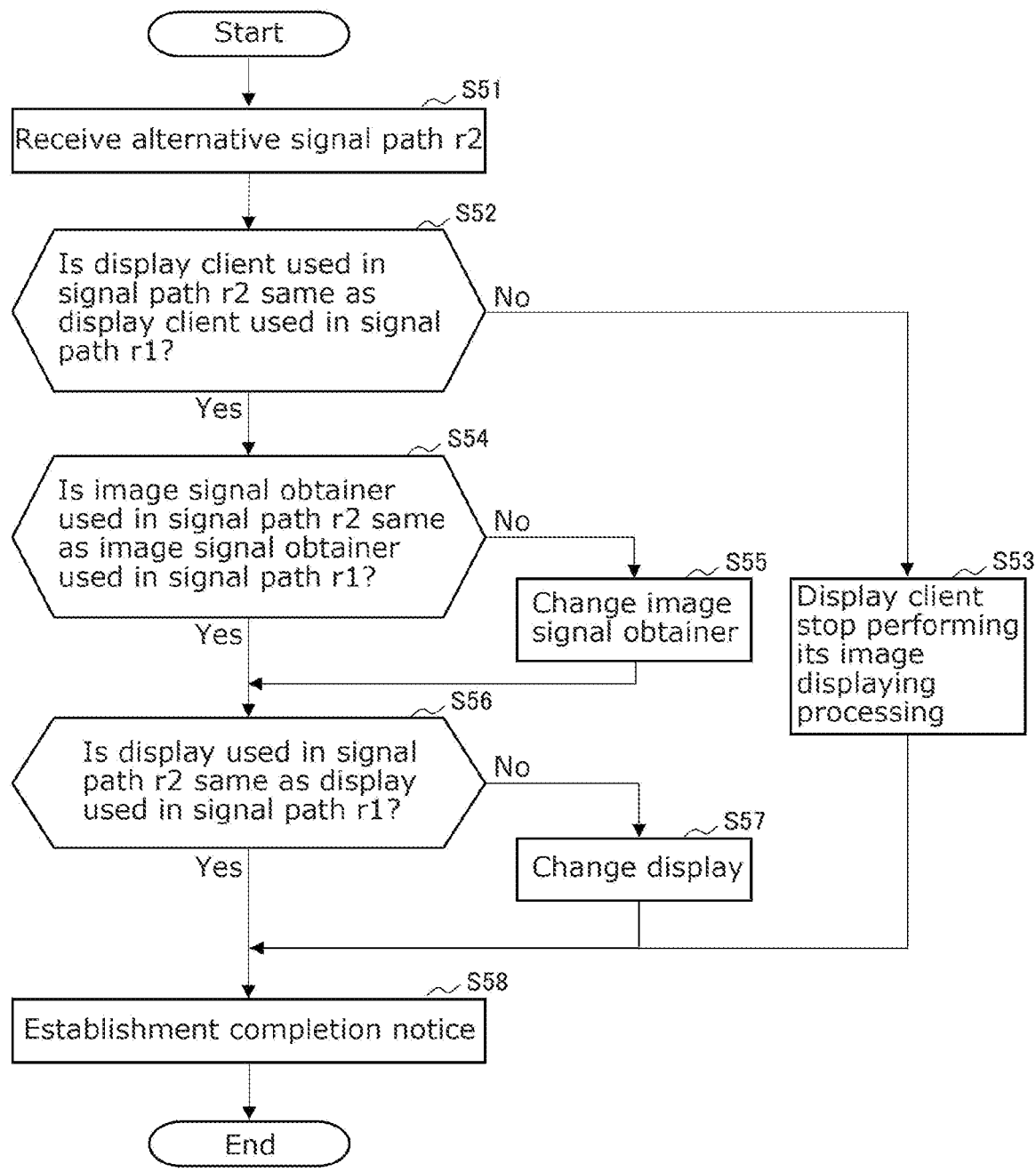
FIG. 6 is a flowchart illustrating operation performed by a display client when an anomaly occurs.

The following describes specific operation performed by application server 10 and display client 30 with reference to FIG. 5 and FIG. 6.

FIG. 5 is a flowchart illustrating operation performed by application server 10 when an anomaly occurs.

When application server 10 receives information about alternative signal path r2 (step S41), application server 10 determines whether an image generator used in alternative signal path r2 is the same as image generator 12*a* used in signal path r1 used under normal conditions (step S42).

When the image generator used in signal path r1 and an image generator used in signal path r2 are different from each other (No in S42), application server 10 changes an internal path to change an image generator for processing vehicle signal s1 (step S43). The information about alternative signal path r2 is stored in storage 15. Application server 10 then replies to system control device 50 with an establishment completion notice (step S44).

Alternatively, when the image generator used in signal path r1 and an image generator used in signal path r2 are the same (Yes in S42), application server 10 does not change the internal path. Since the image generator used in signal path r1 and an image generator used in signal path r2 are the same in this example, the internal path of application server 10 will not be changed. Although the internal path will not be changed, the information about alternative signal path r2 is stored in storage 15, and application server 10 replies to signal path determiner 51 with an establishment completion notice (step S44).

FIG. 6 is a flowchart illustrating operation performed by display client 30 when an anomaly occurs. FIG. 6 describes operation performed by display client 30 as a representative example, and description of operation performed by display client 20 will be omitted.

When display client 30 receives information about alternative signal path r2 (step S51), display client 30 determines whether a display client used in alternative signal path r2 is the same as display client 30 used in signal path r1 used under normal conditions (step S52).

When the display client used in signal path r1 and a display client used in signal path r2 are different from each other (No in S52), display client 30 stops performing its image displaying processing (step S53). The information about alternative signal path r2 is stored in storage 35. Display client 30 then replies to system control device 50 with an establishment completion notice (step S58).

Alternatively, when the display client used in signal path r1 and a display client used in signal path r2 are the same (Yes in S52), display client 30 further determines whether an image signal obtainer used in alternative signal path r2 is the same as image signal obtainer 32*a* used in signal path r1 used under the normal conditions (step S54).

When the image signal obtainer used in signal path r1 and an image signal obtainer used in signal path r2 are different from each other (No in S54), display client 30 changes an internal path to change an image signal obtainer for obtaining image signal s2 (step S55). Alternatively, when the image signal obtainer used in signal path r1 and an image signal obtainer used in signal path r2 are the same (Yes in S54), processing proceeds to the next step S56. Since the image signal obtainer used in signal path r1 and an image signal obtainer used in signal path r2 are the same in this example, an image signal obtainer will not be changed.

Display client 30 further determines whether a display used in alternative signal path r2 is the same as display 34*a* used in signal path r1 used under normal conditions (step S56).

When the display used in signal path r1 and a display used in signal path r2 are different from each other (No in S56), display client 30 changes an internal path to change a display for displaying an image (step S57). Alternatively, when the display used in signal path r1 and a display used in signal path r2 are the same (Yes in S56), display client 30 does not change a display. Note that the display used in signal path r1 and a display used in signal path r2 are different from each other in this example, step S57 is performed to change display 34*a* used in signal path r1 to display 34*b* used in signal path r2. The information about signal path r2 is stored in storage 35. Display client 30 then replies to signal path determiner 51 with an establishment completion notice.

When signal path determiner 51 receives the replied establishment completion notice, signal path determiner 51 transmits a start commanding signal commanding the start of image display processing to each of application server 10 and display clients 20 and 30 (not illustrated in the drawing).

The following describes a situation in which an image is displayed after vehicle signal s1 is actually inputted with reference to FIG. 4 again.

First, switched outputter 11 receives vehicle signal s1 outputted from vehicle signal generator 3 (step S34). Switched outputter 11 outputs vehicle signal s1 to image generator 12*a* according to alternative signal path r2 (step S35). Image generator 12*a* receives vehicle signal s1, converts vehicle signal s1 into image signal s2, and outputs image signal s2 (step S36).

Image signal s2 outputted from image generator 12*a* is inputted to image signal obtainer 32*a* via communicator 13, network N, and communicator 31. Image signal obtainer 32*a* outputs the inputted image signal s2 to display controller 33 (step S37). Display controller 33 outputs image signal s2 to alternative display 34*b* according to alternative signal path r2 (step S38). The alternative display 34*b* displays an image based on the inputted image signal s2 (step S39). This ends processing performed by display system for vehicle 1 when an anomaly occurs in display system for vehicle 1.

As has been described above, the image displaying method of display system for vehicle 1 changes a signal path for transmission of vehicle signals Si and image signals s2, when an anomaly occurs in elements included in display system for vehicle 1. With this, it is possible to readily display an image using a signal path in which an anomaly is not present.

Note that signal path determiner 51 of system control device 50 may revert to signal path r1 which is the former signal path from signal path r2 to which signal path r1 has been changed when an anomaly is gone after an occurrence of the anomaly, and may output information about signal path r1 which is the former signal path to application server 10 and display clients 20 and 30. In this case, each of application server 10 and display clients 20 and 30 may be configured to revert to the former signal path.

In addition, when system control device 50 causes a display to display an image, system control device 50 may alternately switch between a current signal path and a former signal path to cause a single display to alternately display different images. Moreover, system control device 50 may cause a single display to simultaneously display images based on image signals s2. System control device 50 may change the design of a subject to be displayed according to the size and resolution of an alternative display, and may change the design of a subject to be displayed according to an importance level or an emergency level of vehicle information.

In addition, system control device 50 may notify a driver and a passenger that a signal path will be changed and thus an alternative display will be displaying an image. At this time, system control device 50 may obtain directions at which the driver and the passenger are looking using image capturing device 4 to notify the driver and the passenger of a location and a direction of an alternative display using an animation, a graphic, etc. In addition, system control device 50 may notify the driver and the passenger of information about the alternative display using a sound, vibration of a component (e.g., a steering wheel and a seat), or a lighting device. After the information about the alternative display is notified, system control device 50 may stop providing the notification after a predetermined time period has elapsed. System control device 50 may provide the driver and the passenger with a notification of information about the alternative display via a communication terminal (e.g., a smartphone and a tablet terminal of a user) which is different from display clients 20 and 30 provided in vehicle 2. System control device 50 may notify the driver and the passenger of information indicating that a signal path is reverted to the former initial signal path, when the signal path is reverted to the former signal path. System control device 50 may cause display clients 20 and 30 to display information about a failure.

[3. Variation 1 of Embodiment]

Display system for vehicle 1A according to Variation 1 of the embodiment will be described. Variation 1 describes an example in which functions of system control device 50 are incorporated in application server 10A.

Figure 7:
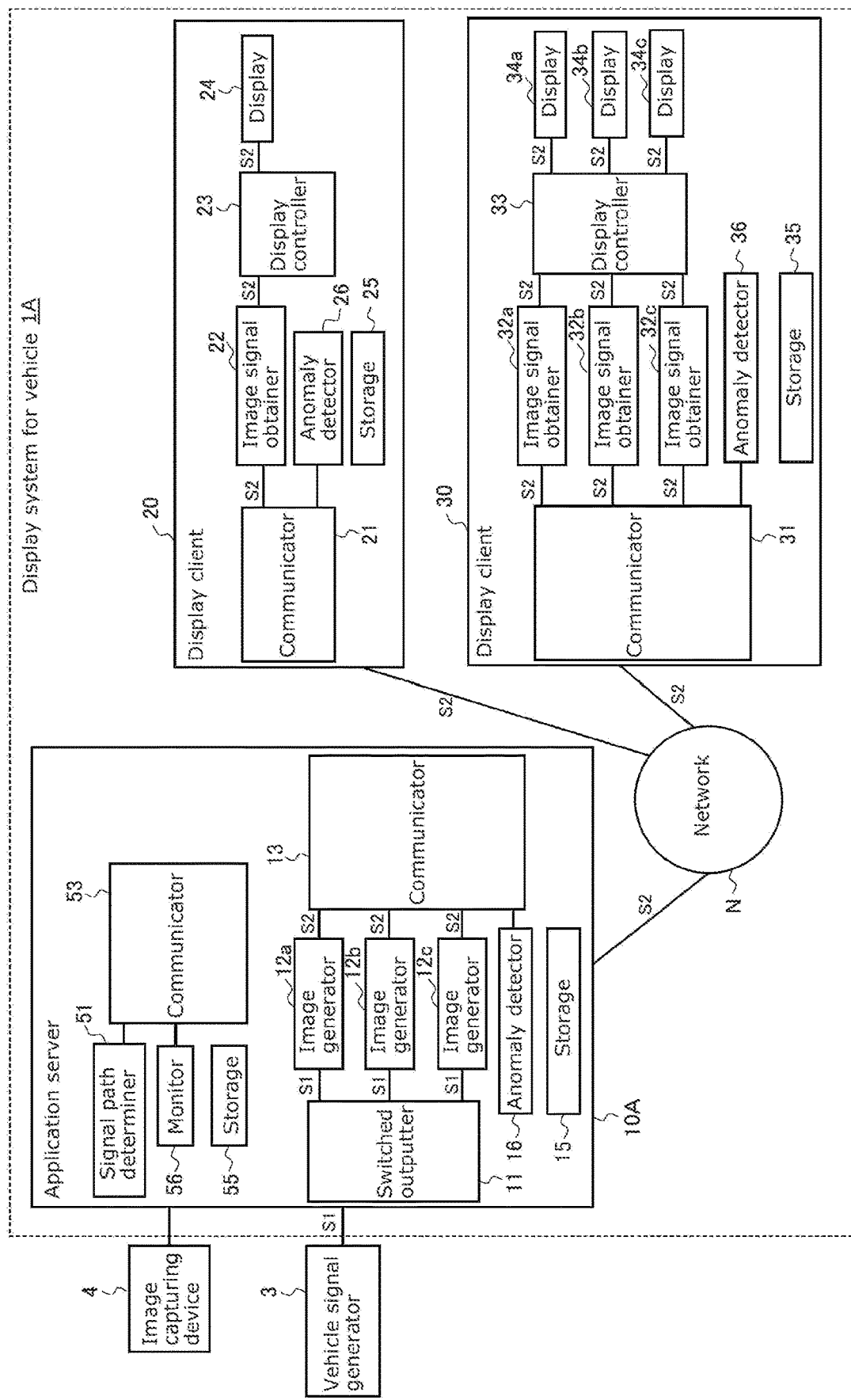
FIG. 7 is a block diagram illustrating a display system for a vehicle according to Variation 1 of the embodiment.

FIG. 7 is a block diagram illustrating display system for vehicle 1A according to Variation 1 of the embodiment.

As illustrated in FIG. 7, display system for vehicle 1A includes application server 10A and display clients 20 and 30. Application server 10A and display clients 20 and 30 are communicatively connected via network N in vehicle 2. Application server 10A is communicatively connected to vehicle signal generator 3.

Application server 10A includes switched outputter 11, image generators 12a, 12b, and 12c, communicator 13, storage 15, and anomaly detector 16. In addition, application server 10A includes signal path determiner 51, communicator 53, storage 55, and monitor 56. In other words, signal path determiner 51 is provided in application server 10A. Note that each of pairs of communicator 13 and communicator 53, storage 15 and storage 55, and anomaly detector 16 and monitor 56 may be integrated.

As well as in display system for vehicle 1A according to Variation 1, signal path determiner 51 changes a signal path for transmission of vehicle signals s1 and image signals s2, when an anomaly occurs in at least one of image generators 12a through 12c included in application server 10A and display clients 20 and 30. With this, it is possible to readily display an image using a signal path in which an anomaly is not present.

Although the foregoing shows an example in which functions of system control device 50 are incorporated in application server 10A, it should be noted that functions of application server 10 illustrated in FIG. 1A may be incorporated in system control device 50. Application server 10A according to Variation 1 also includes a configuration in which functions of application server 10 are incorporated in system control device 50.

[4. Variation 2 of Embodiment]

Display system for vehicle 1B according to Variation 2 of the embodiment will be described. Variation 2 describes an example in which display system for vehicle 1B includes control network N1 and data communication network N2.

Figure 8:
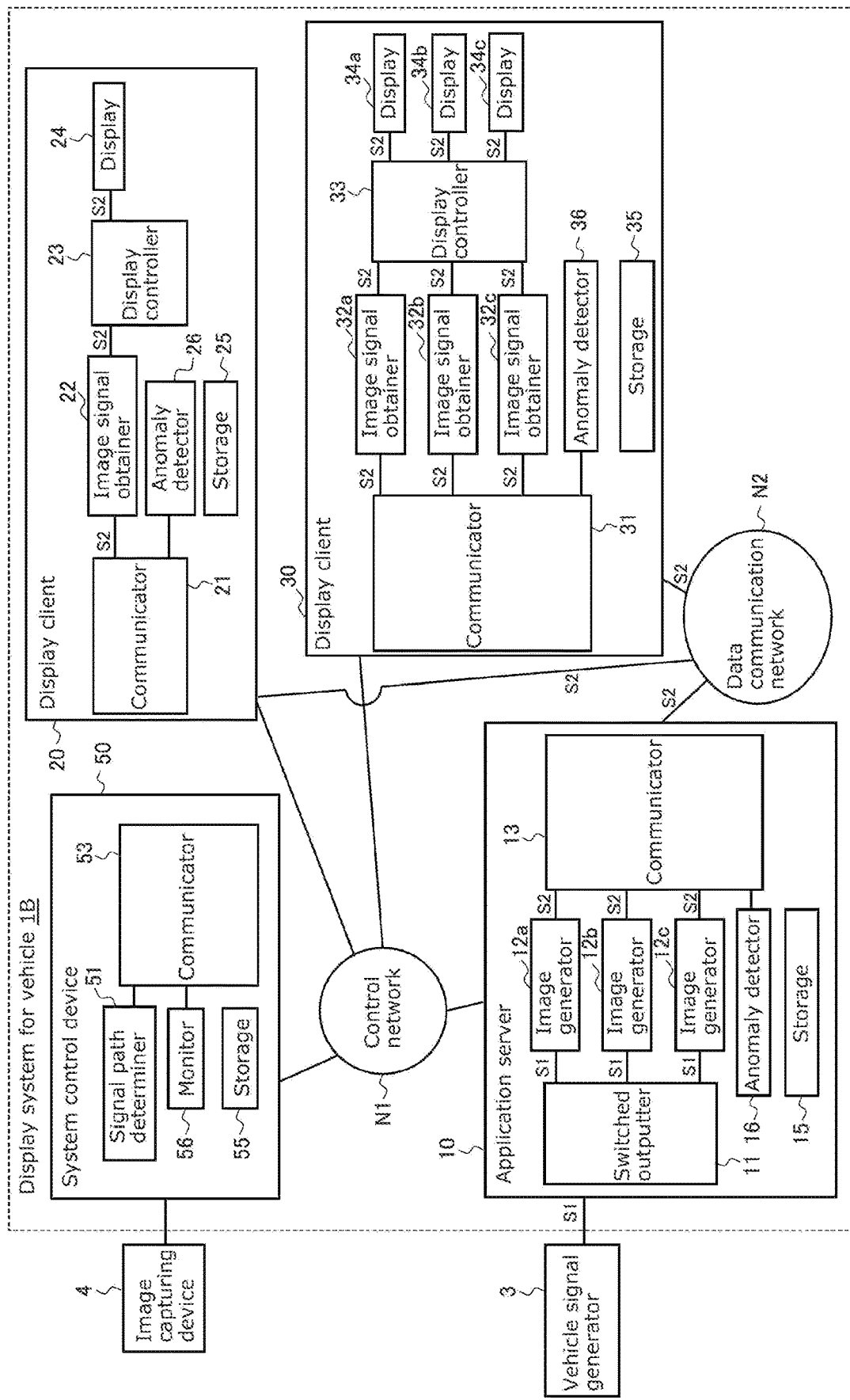
FIG. 8 is a block diagram illustrating a display system for a vehicle according to Variation 2 of the embodiment.

FIG. 8 is a block diagram illustrating display system for vehicle 1B according to Variation 2 of the embodiment.

As illustrated in FIG. 8, display system for vehicle 1B includes application server 10, display clients 20 and 30, and system control device 50. Application server 10, display clients 20 and 30, and system control device 50 are communicatively connected via control network N1 in vehicle 2. In addition, application server 10 and display clients 20 and 30 are communicatively connected via data communication network N2 in vehicle 2. Control network N1 is, for example, a controller area network (CAN), and is connected to the ECU. Data communication network N2 is, for example, Ethernet, and can transmit and receive a larger amount of data than control network N1 can transmit and receive. Image signal s2 of the present disclosure is transmitted via data communication network N2.

As well as in display system for vehicle 1B according to Variation 2, signal path determiner 51 changes a signal path for transmission of vehicle signals s1 and image signals s2, when an anomaly occurs in at least one of image generators 12a through 12c included in application server 10 and display clients 20 and 30. With this, it is possible to readily display an image using a signal path in which an anomaly is not present.

[Other Variations, Etc.]

The foregoing have described the present disclosure based on the embodiment and the variations of the embodiment; however, the present disclosure is not limited to the embodiment and the variations of the embodiment.

In addition, each of the display systems for a vehicle according to the above-described embodiment and the variations of the embodiment may be implemented by a program executed by a computer, and such program may be stored in a storage device.

Moreover, processors included in the display systems for a vehicle according to the embodiment and the variations of the embodiment each are typically implemented as a large-scale integration (LSI) which is an integrated circuit. These circuits may be individually implemented as one chip or may be realized as one chip including some or all of the circuits.

In addition, circuit integration is not limited to LSI; the processors may be realized as a dedicated circuit or a generic processor. A field programmable gate array (FPGA) that is programmable after manufacturing of the LSI circuit, or a reconfigurable processor whose circuit cell connections and settings in the LSI circuit are reconfigurable, may be used.

Note that in the above-described embodiment and variations of the embodiment, each of elements may be achieved by dedicated hardware or a software program suitable for each element. Each element may be achieved by a program executor, such as a central processing unit (CPU) or a processor, reading and executing a software program recorded on a recoding medium such as a hard disk or a semiconductor memory.

In addition, numbers used in the above description are examples for specifically describing the present disclosure, and the embodiment and the variations of the embodiment of the present disclosure are not limited by such numbers.

The block diagrams each illustrate one example of the division of functional blocks: a plurality of functional blocks may be realized as a single functional block, a single functional block may be broken up into a plurality of functional blocks, and part of one function may be transferred to another functional block. Functions of a plurality of functional blocks having similar functions may be processed in parallel or by time-division by a single hardware or software product.

Moreover, the order in which the steps are executed in the flowcharts are mere examples for presenting specific examples of the present disclosure; the orders are not limited to the illustrated orders. Moreover, some of the steps may be executed at the same time as (in parallel with) other steps.

The present disclosure also encompasses: embodiments achieved by applying various modifications conceivable to those skilled in the art to each of the embodiments and variations of the embodiments; and embodiments achieved by optionally combining the structural elements and the functions of each of the embodiments and variations of the embodiments without departing from the essence of the present disclosure.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings and claims are incorporated herein by reference in their entirety: Japanese Patent Application No. 2020-177752 filed on Oct. 23, 2020.

INDUSTRIAL APPLICABILITY

The present disclosure applies to a display system, etc. provided in a vehicle.

What is claimed is:

1. A display system for a vehicle, comprising:
an application server including (i) a switched outputter that receives a vehicle signal outputted from a vehicle, switches between destinations to one of which the vehicle signal received is to be outputted, and outputs the vehicle signal, and (ii) image generators that generate and output an image signal based on the vehicle signal outputted from the switched outputter;
display clients that receive the image signal outputted from the application server, and display an image based on the image signal received; and
a signal path determiner that determines a signal path for connecting the switched outputter, an image generator selected from the image generators, and a display client selected from the display clients to transmit the vehicle signal and the image signal for displaying the image, wherein,
when an anomaly occurs in at least one of the selected image generator and selected display client in a first signal path, the signal path determiner changes from the first signal path to a second signal path, in which at least one of the selected image generator and selected display client is different than that selected in the first signal path, to transmit the vehicle signal and the image signal for displaying the image.

2. The display system for the vehicle according to claim 1, wherein
when the anomaly occurs, the signal path determiner outputs information about the second signal path to the application server, and
the application server establishes the signal path between the switched outputter and one of the image generators, based on the information about the second signal path.

3. The display system for the vehicle according to claim 1, wherein
at least one of the display clients includes image signal obtainers that obtain the image signal, and displays that display the image based on the image signal obtained by the image signal obtainers, and
the signal path determiner determines the first signal path among signal paths connecting the switched outputter, the image generators, the image signal obtainers, and the displays.

4. The display system for the vehicle according to claim 3, wherein
when the anomaly occurs, in at least one element among the image generators, the image signal obtainers, and the displays, the signal path determiner selects, among the signal paths, the second signal path connecting the switched outputter, an image generator among the image generators, an image signal obtainer among image signal obtainers, and a display among the displays in which the anomaly is not present.

5. The display system for the vehicle according to claim 4, wherein
the signal path determiner outputs information about the second signal path to the display clients, and
at least one of the display clients establishes the signal path between one of the image signal obtainers and one of the displays, based on the information about the second signal path.

6. The display system for the vehicle according to claim 1, wherein
when the anomaly is gone after an occurrence of the anomaly, the signal path determiner reverts to the first signal path from the second signal path, and outputs information about the first signal path to the application server and the display clients.

7. The display system for the vehicle according to claim 1, wherein
the signal path determiner changes the signal path for transmission of the vehicle signal and the image signal from the first signal path to the second signal path, based on at least one of an importance level and an emergency level of vehicle information included in the vehicle signal.

8. The display system for the vehicle according to claim 1, wherein
the signal path determiner changes the signal path for transmission of the vehicle signal and the image signal from the first signal path to the second signal path, based on a subject of interest of at least one of a driver and a passenger of the vehicle.

9. The display system for the vehicle according to claim 1, wherein
the application server, the display clients, and the signal path determiner are connected via a network in the vehicle.

10. The display system for the vehicle according to claim 1, wherein
the signal path determiner is provided in the application server, and
the application server and the display clients are connected via a network in the vehicle.

11. The display system for the vehicle according to claim 1, wherein
the application server, the display clients, and the signal path determiner are connected via a control network in the vehicle, and
the application server and the display clients are further connected via a data communication network in the vehicle.

12. An image displaying device for a vehicle that includes a switched outputter that switches a vehicle signal's output destinations and outputs the vehicle signal, image generators that generate an image signal based on the vehicle signal, display clients that display an image based on the image signal, and a signal path determiner that determines a signal path connecting the switched outputter, one of the image generators, and one of the display clients, the image displaying device comprising:
one or more processors; and
one or more memories having instructions, when executed by the one or more processors, to cause the image displaying device to perform operations, the operations comprising:
determining, by the signal path determiner, a first signal path that connects the switched outputter, one of the image generators, and one of the display clients to transmit the vehicle signal and the image signal for displaying the image, and
when an anomaly occurs in at least the one of the image generators and the one of the display clients, changing, by the signal path determiner, the signal path from the first signal path to a second signal path, in which at least one of the image generators and one of the display clients is different than that selected in the first signal path, to transmit the vehicle signal and the image signal for displaying the image.

\* \* \* \* \*